US011809568B2

(12) United States Patent
Wolfrath et al.

(10) Patent No.: US 11,809,568 B2
(45) Date of Patent: Nov. 7, 2023

(54) HYPERVISOR HAVING LOCAL KEYSTORE

(71) Applicant: International Business Machines Corporation, Armonk, NY (US)

(72) Inventors: Joel Wolfrath, Rochester, MN (US); Christopher J. Engel, Rochester, MN (US); Matthew Vaught, Rochester, MN (US); Michael William Bowcutt, Rochester, MN (US); Phillip Scramlin, Rochester, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 312 days.

(21) Appl. No.: 17/318,655

(22) Filed: May 12, 2021

(65) Prior Publication Data
US 2022/0366052 A1    Nov. 17, 2022

(51) Int. Cl.
*G06F 21/57* (2013.01)
*G06F 21/53* (2013.01)
(Continued)

(52) U.S. Cl.
CPC ........ *G06F 21/575* (2013.01); *G06F 9/45558* (2013.01); *G06F 21/53* (2013.01);
(Continued)

(58) Field of Classification Search
CPC .... G06F 21/575; G06F 9/45558; G06F 21/53; G06F 21/602; G06F 2009/45587; G06F 2221/0751; G06F 9/4401
See application file for complete search history.

(56) References Cited

U.S. PATENT DOCUMENTS 8,761,399 B2    6/2014  Agarwal et al.
9,729,517 B2    8/2017  Brandwine et al.
(Continued)

FOREIGN PATENT DOCUMENTS

EP    1759260 A1    3/2007
GB    2592830 A  *  9/2021    ......... G06F 9/30178

OTHER PUBLICATIONS

Francis, Introducing IBM Hyper Protect, GSE UK Conference 2020, Nov. 2020.
(Continued)

*Primary Examiner* — Robert B Leung
*Assistant Examiner* — Bruce S Ashley
(74) *Attorney, Agent, or Firm* — Garg Law Firm, PLLC; Rakesh Garg; Nathan Rau

(57) ABSTRACT

An embodiment includes executing, by a hypervisor, a bootloader with access to a first logical partition of a non-volatile memory, the first logical partition storing a keystore. The embodiment also includes loading, by the bootloader, a kernel with access to the first logical partition of the non-volatile memory. The embodiment also includes receiving, by the bootloader, an encryption key from the keystore. The embodiment also includes performing, by the bootloader, a cryptographic algorithm using the encryption key on the kernel. The embodiment also includes executing, by the bootloader in an event that the performing of the cryptographic algorithm produces a first result, the kernel with access to the first logical partition of the non-volatile memory. The embodiment also includes halting, by the bootloader in an event that the performing of the cryptographic algorithm fails to produce the first result, booting of the kernel and generating an error message.

20 Claims, 8 Drawing Sheets

(51) Int. Cl.
  *G06F 9/455* (2018.01)
  *G06F 21/60* (2013.01)
(52) U.S. Cl.
  CPC .. *G06F 21/602* (2013.01); *G06F 2009/45587* (2013.01); *G06F 2221/0751* (2013.01)

(56) References Cited

U.S. PATENT DOCUMENTS

| | | | |
|---|---|---|---|
| 10,031,783 B2 | 7/2018 | Jalagam et al. | |
| 10,095,496 B2 | 10/2018 | Winterfeldt et al. | |
| 10,581,820 B2 | 3/2020 | Keshava et al. | |
| 2003/0056107 A1* | 3/2003 | Cammack | G06F 21/575 713/189 |
| 2012/0185683 A1* | 7/2012 | Krstic | G06F 21/44 713/193 |
| 2014/0075522 A1* | 3/2014 | Paris | G06F 21/575 726/5 |
| 2014/0123207 A1 | 5/2014 | Agarwal et al. | |
| 2017/0364685 A1* | 12/2017 | Shah | G06F 21/575 |
| 2018/0006815 A1* | 1/2018 | Young | H04L 9/0891 |
| 2018/0365427 A1* | 12/2018 | Callaghan | H04L 9/3247 |

OTHER PUBLICATIONS

Zhu et al., Implement Android Tamper-Resistant Secure Storage and Secure it in Virtualization, Intel, Oct. 2018.
Giannakopoulos et al., Isolation in Docker through Layer Encryption, Jun. 2017.
IP.com, System and Method of Deploying Cluster Server System through production network from very small scale of initial installation without extra management node and device, May 9, 2013.
IP.com, Selective Memory Encryption, Nov. 20, 2015.
IP.com, Parallelizing Dump and Operating System Boot in a Virtualized Environment, Nov. 5, 2012.
Kerrisk, Add_key(2)—Linux manual page, Mar. 22, 2021, https://man7.org/linux/man-pages/man2/add_key.2.html.
Project ACRN, Trusty and Security Services Reference, 2021, https://projectacrn.github.io/latest/tutorials/trustyACRN.html.
IBM, Which Keystore is Right for You, 2021, https://www.ibm.com/support/knowledgecenter/SSB2KG_1.1.0/com.ibm.tivoli.isklm.doc_11/top_EKMipug_choose_keystore.html.

* cited by examiner

HYPERVISOR HAVING LOCAL KEYSTORE

BACKGROUND

The present invention relates generally to a method, system, and computer program product for managing allocation of computing resources in a server cluster. More particularly, the present invention relates to a method, system, and computer program product for tag-driven scheduling of computing resources for function execution.

Software systems that include multiple software application components are typically configured to establish secure communications between the software application components. Such software systems often implement secure communications using cryptography. Cryptography typically involves encryption, which is a process of converting a message into an unintelligible series of characters. Decryption reverses the encryption process, recovering the message from the series of characters. Encryption and decryption algorithms require the use of a "key." The key is a secret string of characters used to encrypt a message or to decrypt a message. In formal mathematical terms, a "cryptosystem" is the ordered list of elements of finite possible plaintexts, finite possible cyphertexts, finite possible keys, and the encryption and decryption algorithms which correspond to each key.

Different types of cryptography schemes are known, including symmetric and asymmetric schemes. In a symmetric cryptography scheme, the sender and the recipient are both in possession of identical secure electronic keys. An asymmetric cryptography scheme makes use of a private/public key pair. The public key and private key are mathematically-related such that a message encrypted using the public key can be decrypted using the private key.

Some software systems that use public key cryptography do so using a Public Key Infrastructure (PKI). A PKI adds another layer of security by providing the public key in the form of a digital certificate. The digital certificate provides a way to verify the authenticity of the public key, for example by registering the certificate with a third-party certificate authority.

SUMMARY

The illustrative embodiments provide for hypervisor having local keystore. An embodiment includes executing, by a hypervisor, a bootloader with access to a first logical partition of a non-volatile memory, the first logical partition storing a keystore. The embodiment also includes loading, by the bootloader, a kernel with access to the first logical partition of the non-volatile memory. The embodiment also includes receiving, by the bootloader, an encryption key from the keystore. The embodiment also includes performing, by the bootloader, a cryptographic algorithm using the encryption key on the kernel. The embodiment also includes executing, by the bootloader in an event that the performing of the cryptographic algorithm produces a first result, the kernel with access to the first logical partition of the non-volatile memory. Other embodiments of this aspect include corresponding computer systems, apparatus, and computer programs recorded on one or more computer storage devices, each configured to perform the actions of the embodiment.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
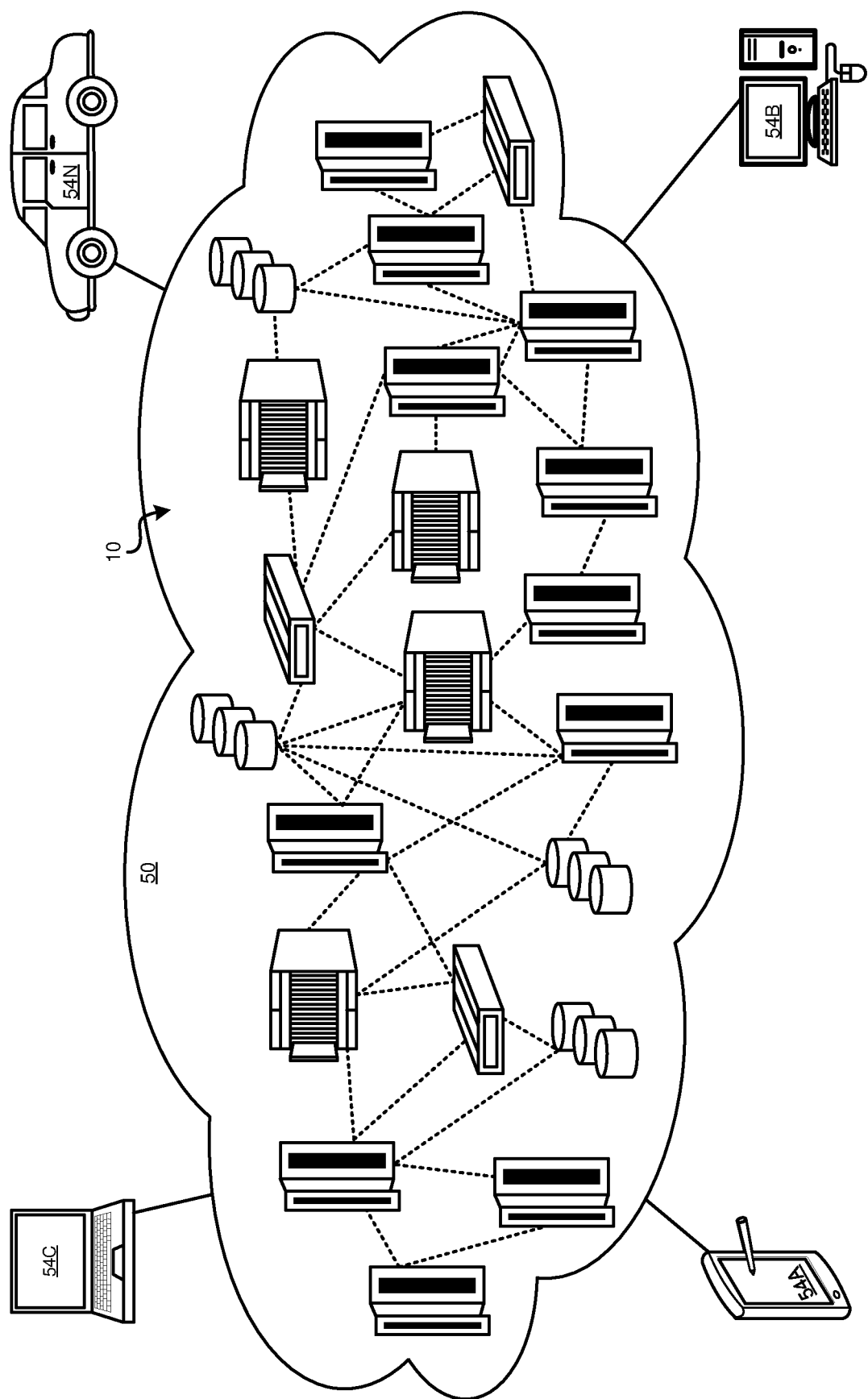
FIG. 1 depicts a cloud computing environment according to an embodiment of the present invention.

Generally, the use of cloud-based applications (e.g., enterprise public cloud applications, third party cloud applications, etc.) has been significantly increasing in recent years. Also, the variety of computing devices accessing such applications has grown significantly as well, from desktop workstations and smart phones to a wide range of Internet of Things (IoT) devices. The diversity and accessibility of cloud-based applications has led access security to become a central concern.

Typical security concerns in a cloud environment are unauthorized access, account hijacking, malicious insiders, etc. Accordingly, there is continuing need for improving various aspects of security associated with cloud-based services.

The present embodiments recognize that, due to the sensitive nature of encryption keys, it is often difficult to effectively manage encryption keys. Encryption keys are often stored in a "keystore," which is a storage entity that is configured to store cryptographic keys and certificates. But it is difficult to locate a keystore where it is accessible for consumers that need to use it, while still isolated from unauthorized consumers. For example, in the case of virtual machines (VMs), it is less than ideal for VMs to store encryption keys in their memory because a data dump from the VM could possibly expose the keys to unauthorized consumers. In rare cases, specialized hardware can be connected to an operating system and can be used to read and write keys, for example into a specialized flash drive. However, such specialized hardware is expensive and can be difficult to use. This is particularly true for virtualized environments, where a large server may be hosting and running a thousand or more VMs that cannot easily share the same specialized hardware.

The illustrated embodiments address and solve these technical problems by providing for a keystore that is accessible very early in the boot process and isolates keys from unauthorized consumers. Embodiments include a keystore that runs on a hypervisor such that the hypervisor provides keystore access to thousands of VMs, and isolates portions of the keystore associated with respective VMs from other VMs and isolates portions of the keystore from different users or consumers within a single VM. The keystore can be used to store asymmetric and/or symmetric keys. These characteristics of the keystore enable the keystore to be used for unique applications that would otherwise be difficult or unfeasible, such as use of the keystore for boot device encryption and other operations that occur prior to kernel runtime, and use of the keystore for persisting public keys for secure boot validation of the VM. The disclosed secure boot process is an example of a process that uses a public part of an asymmetric keypair stored in the keystore. The disclosed encrypted boot process is an example of a process that uses a symmetric key stored in the keystore. In some embodiments, a one-time setup procedure includes writing an encryption key to the keystore, after which the encryption key persists in the keystore for subsequent boots without the need for user intervention. In some embodiments, the disclosed keystore also supports replication of keystore data and consistency protocols for keeping replicas up to date. Also, in some embodiments, this disclosed framework enables secure communication of keys between two consumers (via policies set on the key object).

In some embodiments, a hypervisor executes a bootloader with access to a first logical partition of a non-volatile memory that also stores a keystore. The bootloader then loads a kernel with access to the first logical partition of the non-volatile memory. The bootloader also requests and receives an encryption key for the kernel from the keystore. The bootloader then performs a cryptographic algorithm using the encryption key on the kernel. In some embodiments, the bootloader uses a symmetric key with the cryptographic algorithm to decrypt the kernel as part of an encrypted boot process. Alternatively, the bootloader uses a public key of an asymmetric keypair with the cryptographic algorithm to validate the signature of the kernel as part of a secure boot process.

In some embodiments, if the performing of the cryptographic algorithm produces a particular or expected result, the bootloader executes the kernel with access to the first logical partition of the non-volatile memory, while in an event that the performing of the cryptographic algorithm fails to produce the particular or expected result, the bootloader halts booting of the kernel and generates an error message. For example, for an encrypted boot process, the cryptographic algorithm is used for attempting to decrypt the kernel, so if the cryptographic algorithm produces a decrypted kernel as the particular or expected result, the bootloader executes the kernel with access to the first logical partition of the non-volatile memory. Otherwise, if the cryptographic algorithm does not produce a decrypted kernel, the bootloader halts booting of the kernel and generates an error message. Alternatively, for a secure boot process, the cryptographic algorithm is used for attempting to validate the signature of the kernel, so if the cryptographic algorithm produces a validation of the kernel as the particular or expected result, the bootloader executes the kernel with access to the first logical partition of the non-volatile memory. Otherwise, if the cryptographic algorithm does not produce a validation of the kernel, the bootloader halts booting of the kernel and generates an error message.

Embodiments of the present application were realized in part based on the key insight that if a consumer must persist a password to authenticate with the hypervisor, then this is no better than storing the physical key on the VM disk. In order to prevent consumers from having to persist a password, the disclosed embodiments can build trust based on the software components lower in the stack. For example, if a system assuming that the kernel must trust its bootloader to not set a password for the kernel, the kernel can just generate a new random password each boot and keep it stored in memory. These passwords are then used to provide isolation between the consumers.

In an illustrative embodiment, a host system includes a Service Processor (SP), memory, and a hypervisor. The host system uses "virtualization" to provide isolation between different operating environments sharing the same physical resources, and thereby provides a form of secure operating environments. The virtualization provides a logical abstraction of computing resources from physical constraints. In the illustrated embodiment, the abstraction is provided in the form of VMs, which each have a direct interface to the physical hardware while maintaining the abstraction. Virtualization technology allows multiple VMs running on the same physical hardware to operate independently and isolated from each other. The VMs are managed by the hypervisor. In some embodiments, the hypervisor is a software or firmware layer component responsible for hosting and managing the VMs. For example, in some embodiments, the hypervisor manages the system processor, memory, and allocates other resources for each of the VMs.

The memory stores system firmware and data for a keystore. The keystore is used by the hypervisor while hosting one or more virtual machines (VMs). In some embodiments, the memory is flash memory or equivalent non-volatile memory (e.g., non-volatile random-access memory NVRAM).

In the illustrated embodiment, the SP controls the memory and is responsible for loading and updating the hypervisor from memory. Control and updates over the hypervisor are considered restricted (only digitally signed updates can be applied) therefore the hypervisor is considered trusted and forms part of the core-root of trust (CRT). In some embodiments, the SP also provides diagnostics, initialization, configuration, error detection and correction.

In some embodiments, the SP is a self-contained computer having its own dedicated processor, memory and I/O. In some embodiments, the SP is located on the system board of the host system and operates independently of the rest of the host system. When the host system is connected to a power source (and before being powered on) the SP is supplied power and boots up from the firmware stored in the memory.

In some embodiments, the kernels are part of respective operating systems on respective VMs. The kernels each provides an interface for their respective VMs between a keystore and applications executing in their respective user spaces. In some embodiments, the kernels process key requests from applications in the respective user spaces and translates them into hypercalls (HCALLs) to interact with the keystore.

In some embodiments, the hypervisor is a software component responsible for mapping virtual processors, memory, and I/O devices to the actual physical resources of the host system. In some embodiments, the hypervisor also enforces multi-tier isolation that prohibits the kernels from accessing partitions of a keystore that are assigned to other VMs, prohibits the kernels from accessing keys written to the keystore by their respective bootloaders, and prohibits the kernels from accessing keys written to the keystore by the system firmware. The hypervisor also enforces multi-tier isolation that prohibits the operating system from accessing partitions of the keystore that are assigned to other VMs, and prohibits the operating system from accessing keys written to the keystore by the system firmware.

For example, the hypervisor enforces multi-tier isolation that prohibits the kernel from accessing partitions of the keystore that are assigned to other VMs. More specifically, the hypervisor prohibits the kernel from accessing keys written to keystore by the kernel, by the bootloader, and by the operating system of other VMs. The hypervisor also prohibits the kernel from accessing keys written to the keystore by the bootloader of the same VM and also prohibits the kernel from accessing keys written to the keystore by the system firmware. Similarly, the hypervisor prohibits the kernel from accessing keys written to keystore by any of the kernel the bootloader the operating system, the bootloader and the system firmware. Also, the hypervisor prohibits the operating system from accessing keys written to keystore by any of the kernel the bootloader the kernel the bootloader and the system firmware.

The VMs are started up by a booting process that loads system software into a logical partition of the memory of the host system. The hypervisor initiates booting of the VM by loading and executing boot firmware that performs a power-on self-test, followed by loading and execution of the bootloader. The bootloader, in turn, runs the kernel and allows the operating system of the VM to complete the booting process. In some embodiments, the bootloader executes the kernel without any verification that the kernel can be trusted.

Alternatively, some embodiment implement "secure" booting that may be enabled for verification of the kernel. In some embodiments, with secure booting enabled, the bootloader checks that the kernel is digitally signed with a private key of a private/public key pair of cryptographic keys. Advantageously, since the keystore is available during the boot process, the bootloader is able to request the public key during the boot process. For example, in some embodiments, the bootloader issues an HCALL to the hypervisor to request the public key for the kernel. In some embodiments, the hypervisor responds to the request by fetching the public key for the kernel and providing the public key to the bootloader. The bootloader is then able to check the authenticity of the kernel using the public key. If the kernel fails to be authenticated using the public key, the bootloader halts the booting process. Otherwise, if the bootloader verifies the authenticity of the kernel using the public key, then the bootloader runs the kernel and allows the operating system to boot.

In some such embodiments, the bootloader defines a policy for allowing the operating system to read public keys in the keystore and for restricting the operating system from manipulating public keys in the keystore. In some embodiments, a "policy" is an attribute of a key stored in the keystore that specifies the conditions under which a consumer may read or write the key in storage. Some examples include having a password set for the consumer and having secure boot enabled on the VM. In some embodiments, when a key is written to the keystore, a policy must be specified that indicates which conditions must be satisfied.

In some embodiments, a keystore is subject to multiple different policies depending on the type or location of the consumer.

For example, in some embodiments the hypervisor has a read interface and a write interface exposed to the bootloader. The write interface is used to write a key to the keystore and the read interface is used to read a key from the keystore.

In some embodiments the hypervisor makes the read and write interfaces available to consumers of the keystore. A "consumer" as used herein is a specific user of the keystore that exists within a single VM instance. Some examples of consumers include the bootloader the kernel the operating system, and user level programs in the user spaces.

In some embodiments, the read and write interfaces require the bootloader (or any other consumer) to specify certain credentials to verify that the bootloader is authorized to perform the requested read or write operation. For example, in some embodiments, in order to write a key to the keystore, the write interface requires the bootloader to specify its consumer ID, the object label that identifies the requested key, and other information per policies implemented as being required to access the key.

In some embodiments, an object label includes a unique ID that identifies a key in the keystore. In some embodiments, the labels are not necessarily unique across consumers, but they are unique across all keys written by a specific consumer.

In some embodiments, the write interface requires the bootloader to provide a correct password in order to access the key. Similarly, in some embodiments, in order to read a key from the keystore, the read interface requires the bootloader to specify its consumer ID, a correct password used to authenticate the bootloader and the object label that identifies the requested key, and other information per policies implemented as being required to access the key. If the bootloader satisfies the policies associated with the key, the hypervisor returns the key to the bootloader.

In some embodiments, a "password" is a series of bytes used to authenticate a specific consumer. In some embodiments, the password is set each time the VM boots and is not required to match across boots, i.e., from one boot to the next. In some such embodiments, each time the VM boots, each consumer in the VM selects a new password. This mechanism allows for a second tier of isolation, where the first tier of isolation is between VMs, and the second is between specific consumers of the same VM. In order to prevent the consumers from having to persist a password, the host system implements a trust where certain consumers automatically trust their lower-level consumers (e.g., a kernel trusts the bootloader of the same VM and trusts the hypervisor; the bootloader trusts the hypervisor but not the kernel). Assuming the kernel must trust its bootloader to not set a password for the kernel the kernel can just generate a new random password each boot and keep it stored in memory. These passwords are then used to provide isolation between the consumers within the same VM.

As another alternative, in some embodiments the keystore and hypervisor allow for an encrypted boot as a security mechanism that hides sensitive information embedded in the bootloader data when it is in persistent data storage. The hypervisor initiates booting of VM by loading system firmware. Next, the system firmware selects a password for authenticating to the hypervisor and optionally for read/write operations to the keystore.

The system firmware then continues booting the VM by loading the bootloader. The system firmware then determines if the bootloader is encrypted. If the bootloader is encrypted, the system firmware loads the bootloader key from the keystore. The bootloader key is a symmetric encryption key that the system firmware uses to decrypt the bootloader. Next, the hypervisor implements first tier isolation that prohibits the system firmware from accessing the keystores of other virtual machines. The bootloader then selects a password for authenticating to the hypervisor and optionally for read/write operations to the keystore.

The bootloader firmware continues to boot the VM by loading the Kernel and determining if the Kernel is encrypted. If the Kernel is encrypted, the bootloader loads the Kernel key from the keystore. The Kernel key is a symmetric encryption key that the Kernel uses to decrypts the Kernel. The hypervisor then implements first and second tier isolation that prohibits bootloader from accessing the keystores of other VMs and from accessing keys written to the keystore by the system firmware. Next, the kernel selects a password for authenticating to the hypervisor and optionally for read/write operations to the keystore. The kernel then takes over execution of the VM and implements first and second tier isolation that prohibits the kernel from accessing the keystores of other VMs and from accessing keys written to the keystore by the system firmware or the bootloader.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or component that are not shown or described herein, or structures or components different from those shown but for a similar function as described herein may be present without departing the scope of the illustrative embodiments.

Furthermore, the illustrative embodiments are described with respect to specific actual or hypothetical components only as examples. The steps described by the various illustrative embodiments can be adapted for providing explanations for decisions made by a machine-learning classifier model.

Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, contrastive explanations, computer readable storage medium, high-level features, historical data, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

With reference to FIG. 1, this figure depicts an illustrative cloud computing environment 50. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
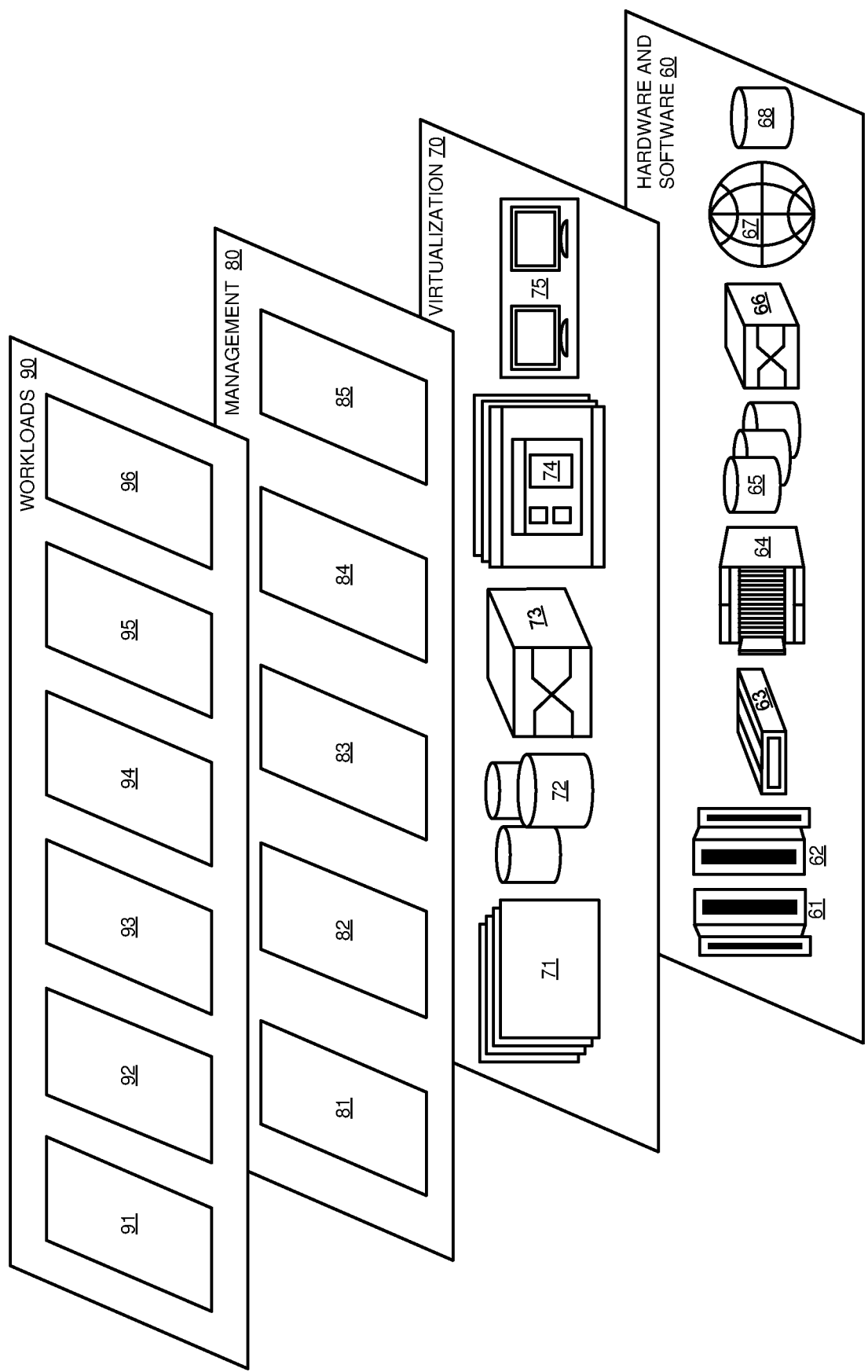
FIG. 2 depicts abstraction model layers according to an embodiment of the present invention.

With reference to FIG. 2, this figure depicts a set of functional abstraction layers provided by cloud computing environment 50 (FIG. 1). It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop 96.

Figure 3:
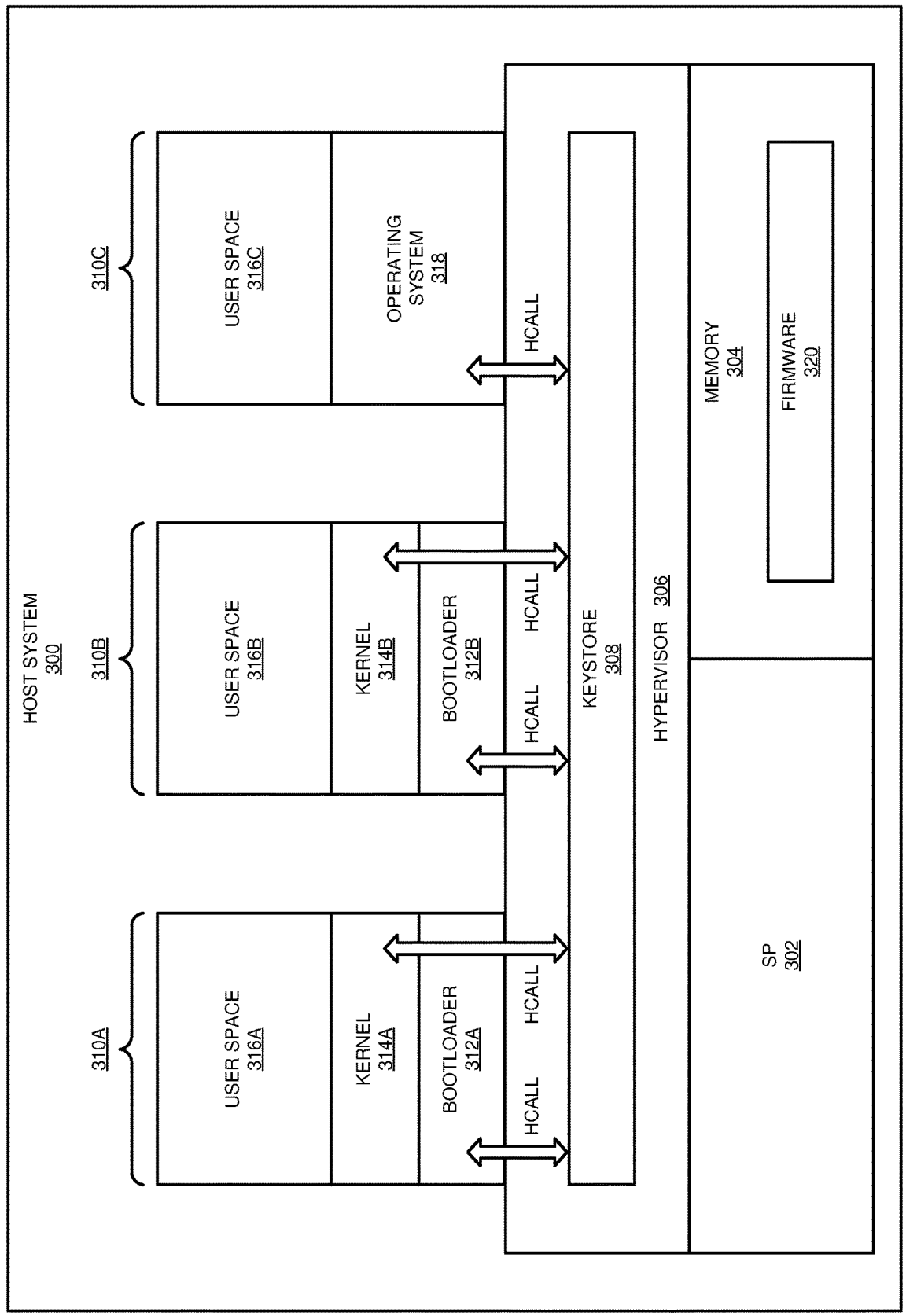
FIG. 3 depicts a block diagram of a host system in accordance with an illustrative embodiment.

With reference to FIG. 3, this figure depicts a block diagram of a host system 300 in accordance with an illustrative embodiment. In some embodiments, the host system 300 is an example of a RISC architecture-based server 62, a server 63, or a blade server 64 of FIG. 2. In the illustrated embodiment, the host system 300 includes a hypervisor 306. In some embodiments, the hypervisor 306 is an example of network application server software 67 of FIG. 1.

In the illustrated embodiment, the host system 300 includes a Service Processor (SP) 302, memory 304, and a hypervisor 306. The host system 300 uses "virtualization" to provide isolation between different operating environments sharing the same physical resources, and thereby provides a form of secure operating environments. The virtualization provides a logical abstraction of computing resources from physical constraints. In the illustrated embodiment, the abstraction is provided in the form of VMs 310A-310, which each have a direct interface to the physical hardware while maintaining the abstraction. Virtualization technology allows multiple VMs running on the same physical hardware to operate independently and isolated from each other. The VMs 310A-310C are managed by the hypervisor 306. In some embodiments, the hypervisor 306 is a software or firmware layer component responsible for hosting and managing the VMs 310A-310C. For example, in some embodiments, the hypervisor 306 manages the system processor, memory, and allocates other resources for each of the VMs 310A-310C.

While three VMs are shown, actual implementations may include any number of VMS. In the illustrated embodiment, the VMs 310A and 310B include respective bootloaders 312A and 312B and respective kernels 314A and 314B. However, the configuration of the VMs may vary, for example as shown for VM 310C that includes an operating system 318 instead of a kernel/bootloader configuration. Each of the VMs 310A-310C also includes a respective one of the user spaces 316A-316C.

Figure 5:
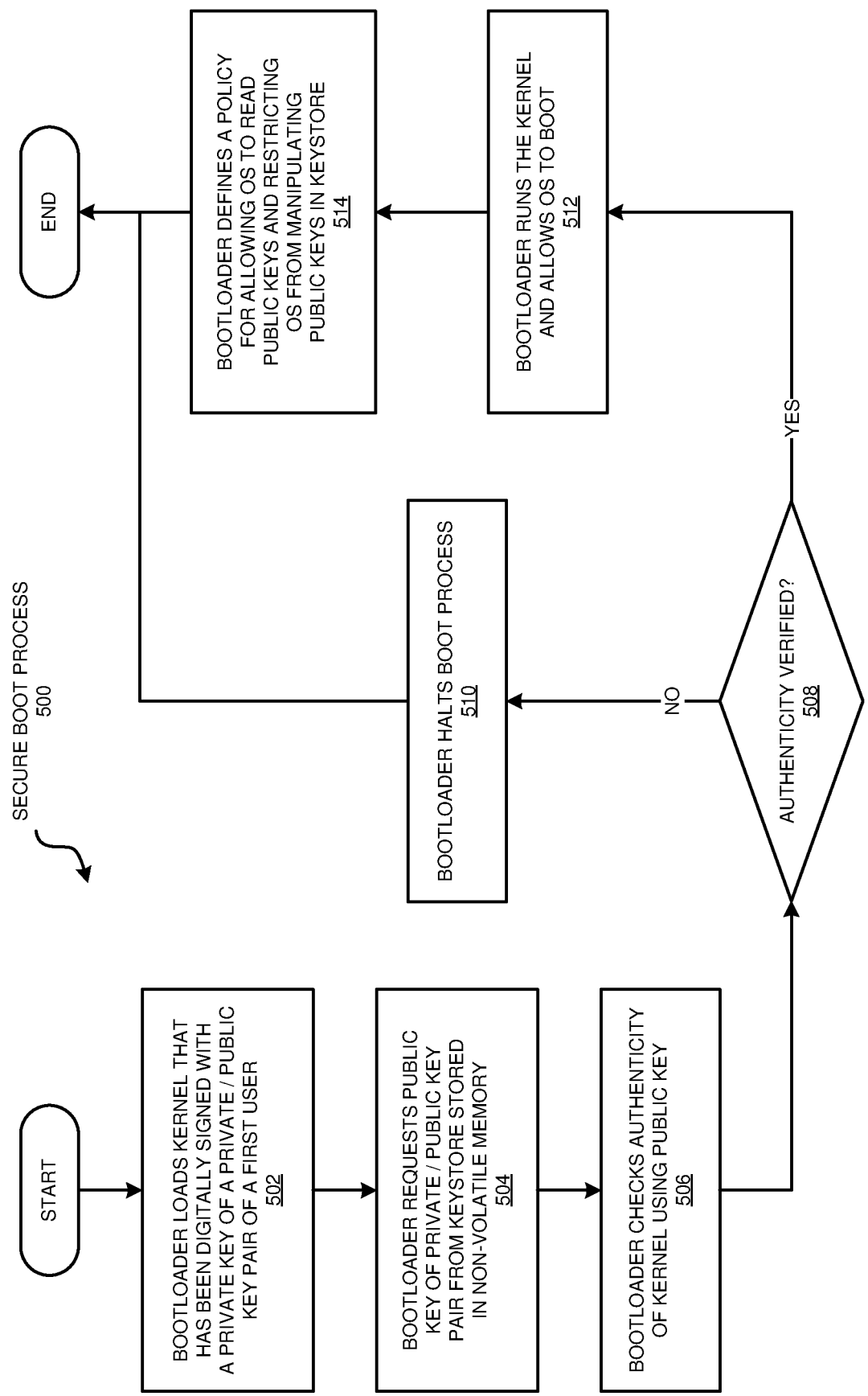
FIG. 5 depicts a flowchart of an example secure boot process in accordance with an illustrative embodiment.
Figure 6:
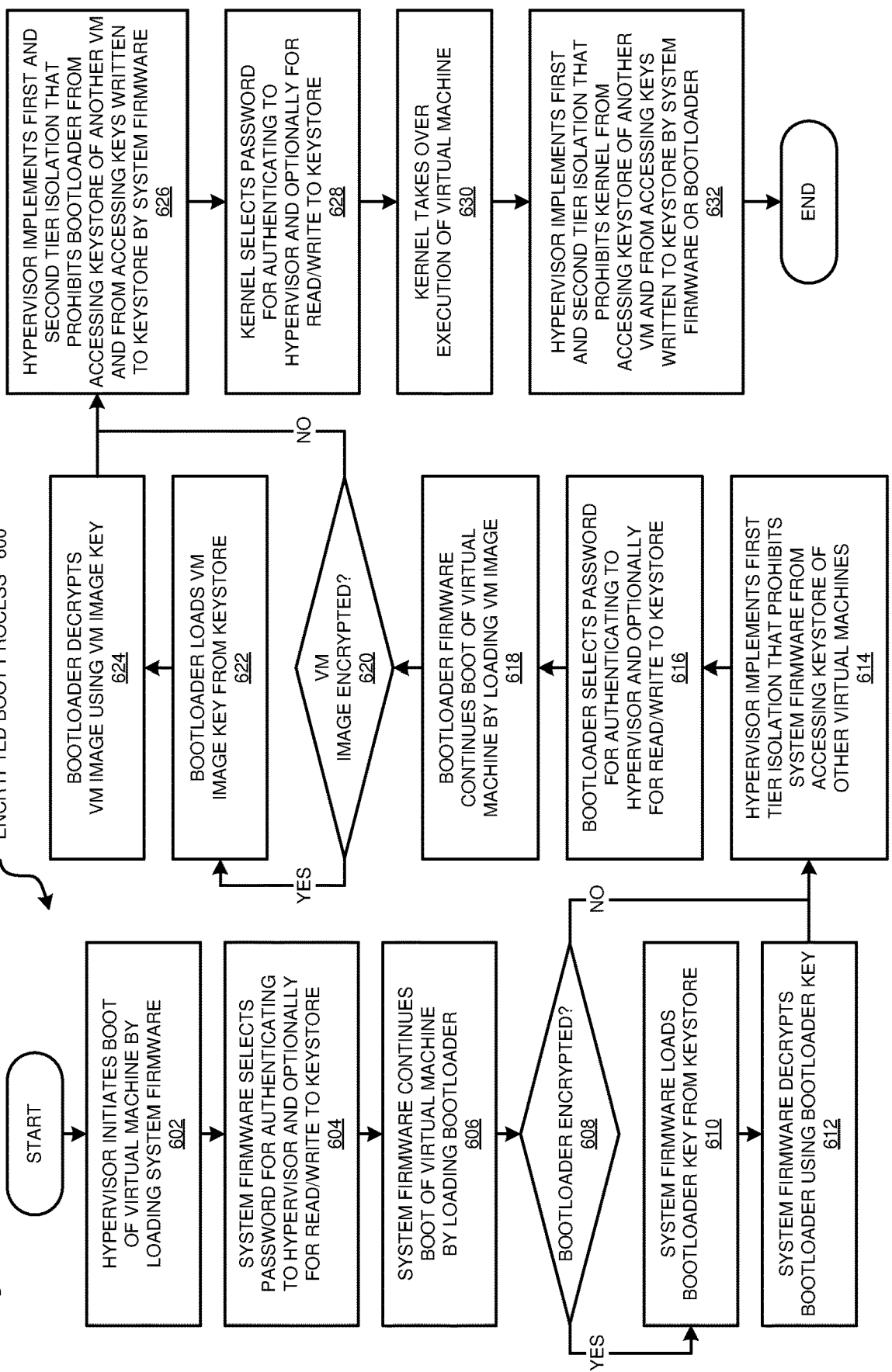
FIG. 6 depicts a flowchart of an example encrypted boot process in accordance with an illustrative embodiment.

The memory 304 stores system firmware 320 and data for a keystore 308. The keystore 308 is used by the hypervisor 306 while hosting one or more virtual machines (VMs) 310A, 310B, and 310C. In some embodiments, the memory 304 is flash memory or equivalent non-volatile memory (e.g., non-volatile random-access memory NVRAM). The keystore can be used to store asymmetric and/or symmetric keys. The disclosed secure boot process 500 of FIG. 5 is an example of a process that uses a public part of an asymmetric keypair stored in the keystore 308. The encrypted boot process 600 of FIG. 6 is an example of a process that uses a symmetric key stored in the keystore 308.

In the illustrated embodiment, the SP 302 controls the memory 304 and is responsible for loading and updating the hypervisor 306 from memory 304. Control and updates over the hypervisor 306 are considered restricted (only digitally signed updates can be applied) therefore the hypervisor 306 is considered trusted and forms part of the core-root of trust (CRT). In some embodiments, the SP 302 also provides diagnostics, initialization, configuration, error detection and correction.

In some embodiments, the SP 302 is a self-contained computer having its own dedicated processor, memory and I/O. In some embodiments, the SP 302 is located on the system board of the host system 300 and operates independently of the rest of the host system 300. When the host system 300 is connected to a power source (and before being powered on) the SP 302 is supplied power and boots up from the firmware 320 stored in the memory 304.

In some embodiments, the kernels 314A, 314B are part of respective operating systems on VMs 310A, 310B, respectively. The kernels 314A, 314B each provides an interface for their respective VMs 310A, 310B between a keystore 308 and applications executing in their respective user spaces 316A, 316B. In some embodiments, the kernels 314A, 314B processes key requests from applications in the respective user spaces 316A, 316B and translates them into hypercalls (HCALLs) to interact with the keystore 308.

In some embodiments, the hypervisor 306 is a software component responsible for mapping virtual processors, memory, and I/O devices to the actual physical resources of the host system 300. In some embodiments, the hypervisor 306 also enforces multi-tier isolation that prohibits the kernels 314A, 314B from accessing partitions of the keystore 308 that are assigned to other VMs, prohibits the kernels 314A, 314B from accessing keys written to the keystore 308 by their respective bootloaders 312A, 312B, and prohibits the kernels 314A, 314B from accessing keys written to the keystore 308 by the system firmware 320. The hypervisor 306 also enforces multi-tier isolation that prohibits the operating system 318 from accessing partitions of the keystore 308 that are assigned to other VMs, and prohibits the operating system 318 from accessing keys written to the keystore 308 by the system firmware 320.

For example, the hypervisor 306 enforces multi-tier isolation that prohibits the kernel 314A from accessing partitions of the keystore 308 that are assigned to other VMs, which means that the hypervisor 306 prohibits the kernel 314A from accessing keys written to keystore 308 other VMs, including VMs 310B and 310C. More specifically, the hypervisor 306 prohibits the kernel 314A from accessing keys written to keystore 308 by the kernel 314B, by the bootloader 312B, and by the operating system 318. The hypervisor 306 also prohibits the kernel 314A from accessing keys written to the keystore 308 by the bootloader 312A and also prohibits the kernel 314A from accessing keys written to the keystore 308 by the system firmware 320. Similarly, the hypervisor 306 prohibits the kernel 314B from accessing keys written to keystore 308 by any of the kernel 314A, the bootloader 312A, the operating system 318, the bootloader 312B, and the system firmware 320. Also, the hypervisor 306 prohibits the operating system 318 from accessing keys written to keystore 308 by any of the kernel 314A, the bootloader 312A, the kernel 314B, the bootloader 312B, and the system firmware 320.

The VMs 310A-310C are started up by a booting process that loads system software into a logical partition of the memory 304 of the host system 300. The secure boot and encrypted boot processes will be described below with reference to VM 310A, but applies equally to other VMs, including VM 310B and VM 310C.

The hypervisor 306 initiates booting of the VM 310A by loading and executing boot firmware that performs a power-on self-test, followed by loading and execution of the bootloader 312A. The bootloader 312A, in turn, runs the kernel 314A and allows the operating system of the VM 310A to complete the booting process. In some embodiments, the bootloader 312A executes the kernel 314A without any verification that the kernel 314A can be trusted.

Alternatively, some embodiments implement "secure" booting that may be enabled for verification of the kernel 314A. In some embodiments, with secure booting enabled, the bootloader 312A checks that the kernel 314A is digitally signed with a private key of a private/public key pair of cryptographic keys. Advantageously, since the keystore 308 is available during the boot process, the bootloader 312A is able to request the public key during the boot process. For example, in some embodiments, the bootloader 312A issues an HCALL to the hypervisor 306 to request the public key for the kernel 314A. In some embodiments, the hypervisor 306 responds to the request by fetching the public key for the kernel 314A and providing the public key to the bootloader 312A. The bootloader 312A is then able to check the authenticity of the kernel 314A using the public key. If the kernel 314A fails to be authenticated using the public key, the bootloader 312A halts the booting process. Otherwise, if the bootloader verifies the authenticity of the kernel 314A using the public key, then the bootloader runs the kernel and allows the operating system to boot.

In some such embodiments, the bootloader 312A defines a policy for allowing the operating system to read public keys in the keystore 308 and for restricting the operating system from manipulating public keys in the keystore 308. In some embodiments, a "policy" is an attribute of a key stored in the keystore 308 that specifies the conditions under which a consumer may read or write the key in storage. Some examples include having a password set for the consumer and having secure boot enabled on the VM. In some embodiments, when a key is written to the keystore 308, a policy must be specified that indicates which conditions must be satisfied. In some embodiments, a keystore 308 is subject to multiple different policies depending on the type or location of the consumer.

For example, in some embodiments the hypervisor 306 has a read interface and a write interface exposed to the bootloader 312A. The write interface is used to write a key to the keystore 308 and the read interface is used to read a key from the keystore 308.

In some embodiments the hypervisor 306 makes the read and write interfaces available to consumers of the keystore 308. A "consumer" as used herein is a specific user of the keystore 308 that exists within a single VM instance. Some examples of consumers include the bootloader 312A, 312B, the kernel 314A, 314B, the operating system 318, and user level programs in the user spaces 316A-316C.

In some embodiments, the read and write interfaces require the bootloader 312A (or any other consumer) to specify certain credentials to verify that the bootloader 312A is authorized to perform the requested read or write operation. For example, in some embodiments, in order to write a key to the keystore 308, the write interface requires the bootloader 312A to specify its consumer ID, the object label that identifies the requested key, and other information per policies implemented as being required to access the key.

In some embodiments, an object label includes a unique ID that identifies a key in the keystore 308. In some embodiments, the labels are not necessarily unique across consumers, but they are unique across all keys written by a specific consumer.

In some embodiments, the write interface requires the bootloader 312A to provide a correct password in order to access the key. Similarly, in some embodiments, in order to read a key from the keystore 308, the read interface requires the bootloader 312A to specify its consumer id, a correct password used to authenticate the bootloader 312A, and the object label that identifies the requested key, and other information per policies implemented as being required to access the key. If the bootloader 312A satisfies the policies associated with the key, the hypervisor 306 returns the key to the bootloader 312A.

In some embodiments, a "password" is a series of bytes used to authenticate a specific consumer. In some embodiments, the password is set each time the VM boots and is not required to match across boots, i.e., from one boot to the next. In some such embodiments, each time the VM boots, each consumer in the VM selects a new password. This mechanism allows for a second tier of isolation, where the first tier of isolation is between VMs, and the second is between specific consumers of the same VM. In order to prevent the consumers from having to persist a password, the host system 300 implements a trust where certain consumers automatically trust their lower-level consumers (e.g., kernel 314A trusts bootloader 312A and hypervisor 306; bootloader 312A trusts hypervisor 306 but not kernel 314A). Assuming the kernel 314A must trust its bootloader 312A to not set a password for the kernel 314A, the kernel 314A can just generate a new random password each boot and keep it stored in memory 304. These passwords are then used to provide isolation between the consumers within the same VM 310A.

As another alternative, in some embodiments the keystore 308 and hypervisor 306 allow for an encrypted boot as a security mechanism that hides sensitive information embedded in the bootloader data when it is in persistent data storage. The hypervisor 306 initiates booting of VM 310A by loading system firmware. Next, the system firmware selects a password for authenticating to the hypervisor 306 and optionally for read/write operations to the keystore 308.

The system firmware then continues booting the VM 310A by loading the bootloader 312A. The system firmware then determines if the bootloader 312A is encrypted. If the bootloader 312A is encrypted, the system firmware loads the bootloader key from the keystore 308. The bootloader key is a symmetric encryption key that the system firmware uses to decrypt the bootloader 312A. Next, the hypervisor 306 implements first tier isolation that prohibits the system firmware from accessing the keystores of other virtual machines. The bootloader 312A then selects a password for authenticating to the hypervisor 306 and optionally for read/write operations to the keystore 308.

Alternatively, in some embodiments, the bootloader 312A is monolithic in that it includes the firmware. In some such embodiments, the hypervisor 306 initiates booting of the VM 310A by loading the bootloader 312A. In some such embodiments, the hypervisor 306 then determines if the bootloader 312A is encrypted. If the bootloader 312A is encrypted, the hypervisor 306 loads the bootloader key from the keystore 308. The bootloader key is a symmetric key that the hypervisor 306 uses to decrypt the bootloader 312A. Next, the hypervisor 306 implements first tier isolation that prohibits the bootloader 312A from accessing the keystores of other virtual machines. The bootloader 312A then selects a password for authenticating to the hypervisor 306 and optionally for read/write operations to the keystore 308.

The bootloader 312A continues to boot the VM 310A by loading the VM image (or kernel) and determining if the VM image is encrypted. If the VM image is encrypted, the bootloader 312A loads the VM image key from the keystore 308. The VM image key is a symmetric key that the bootloader 312A uses to decrypt the VM image. The hypervisor 306 then implements first and second tier isolation that prohibits bootloader 312A from accessing the keystores of other VMs and from accessing keys written to the keystore 308 by the system firmware. Next, the kernel 314A selects a password for authenticating to the hypervisor 306 and optionally for read/write operations to the keystore 308. The kernel 314A then takes over execution of the VM 310A and implements first and second tier isolation that prohibits the kernel 314A from accessing the keystores of other VMs and from accessing keys written to the keystore 308 by the system firmware or the bootloader 312A.

Figure 4:
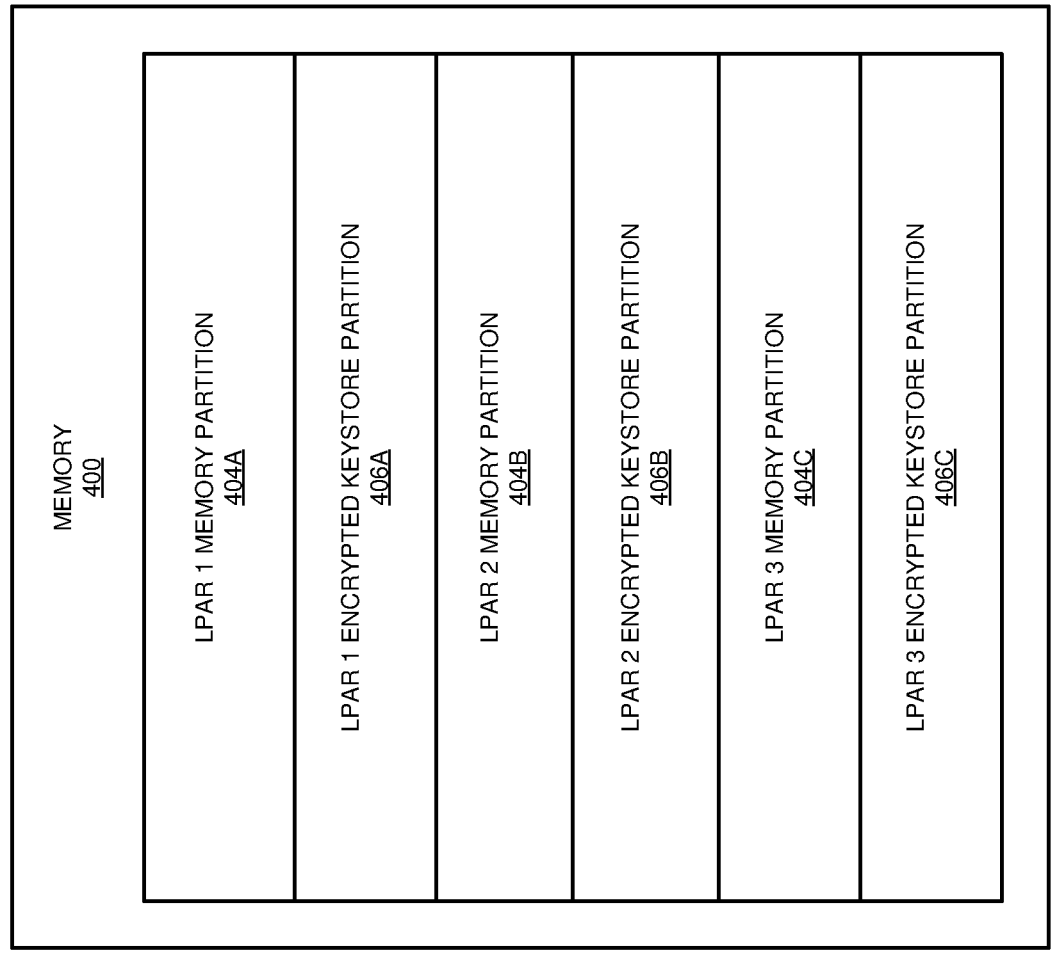
FIG. 4 depicts a block diagram of logical partitions (LPARs) of memory in accordance with an illustrative embodiment.

With reference to FIG. 4, this figure depicts a block diagram of logical partitions (LPARs) of memory 400 in accordance with an illustrative embodiment. In some embodiments, the memory 400 is an example of memory 304 of FIG. 3. In some embodiments, the LPAR 1 is an example of VM 310A of FIG. 3, the LPAR 2 is an example of VM 310B of FIG. 3, and the LPAR 3 is an example of VM 310C of FIG. 3.

In the illustrated embodiment, the memory 400 is a physical hardware memory component that is partitioned into multiple logical partitions, each hosting a separate instance of an operating system. The LPAR 1 includes a memory partition 404A and an encrypted keystore partition 406A. The LPAR 2 includes a memory partition 404B and an encrypted keystore partition 406B. The LPAR 3 includes a memory partition 404C and an encrypted keystore partition 406C. The LPARs 1-3 divide the hardware resources of the memory 400 such that each LPAR is only able to access a respective range of addresses that do not overlap with memory addresses that are accessible to other LPARs. In some embodiments, two or more LPARs share a CPU. Alternatively, in some embodiments, each LPAR uses one or more dedicated CPUs.

In some embodiments, the LPARs 1-3 are managed by a hypervisor, for example hypervisor 306 of FIG. 3. In some such embodiments, the hypervisor enforces multi-tier isolation that prohibits the LPARs 1-3 from accessing the encrypted keystore partitions 406A-406C that are assigned to other LPARs 1-3. For example, the hypervisor prohibits the LPAR 1 from accessing the encrypted keystore partitions 406B and 406C of LPARs 2-3. The hypervisor prohibits the LPAR 2 from accessing the encrypted keystore partitions 406A and 406C of LPARs 1 and 3. The hypervisor prohibits the LPAR 3 from accessing the encrypted keystore partitions 406B and 406C of LPARs 2 and 3.

In some embodiments, the hypervisor enforces multi-tier isolation that also prohibits the LPARs 1-3 from accessing the memory partitions 404A-404C that are assigned to other LPARs 1-3. For example, the hypervisor prohibits the LPAR 1 from accessing the memory partitions 404B and 404C of LPARs 2-3. The hypervisor prohibits the LPAR 2 from accessing the memory partitions 404A and 404C of LPARs 1 and 3. The hypervisor prohibits the LPAR 3 from accessing the memory partitions 404B and 404C of LPARs 2 and 3.

With reference to FIG. 5, this figure depicts a flowchart of an example secure boot process 500 in accordance with an illustrative embodiment. In a particular embodiment, the host system 300 carries out the process 500.

In an embodiment, at block 502, the bootloader loads a kernel that has been digitally signed with a private key of a private/public key pair of a first user. Next, at block 504, the bootloader requests the public key of private/public key pair from keystore stored in non-volatile memory. Next, at block 506, the bootloader checks the authenticity of the kernel using public key. Next, at block 508, if the kernel fails to be authenticated using the public key, the bootloader halts the booting process at block 510 and the booting process ends. Otherwise, if the bootloader verifies the authenticity of the kernel, then at block 512 the bootloader runs the kernel and allows the operating system to boot. Next, at block 514, the bootloader defines a policy for allowing the operating system to read public keys in the keystore and for restricting the operating system from manipulating public keys in the keystore.

With reference to FIG. 6, this figure depicts a flowchart of an example encrypted boot process 600 in accordance with an illustrative embodiment. In a particular embodiment, the host system 300 carries out the process 600.

In an embodiment, at block 602, the hypervisor initiates booting of a virtual machine by loading system firmware. Next, at block 604, the system firmware selects a password for authenticating to the hypervisor and optionally for read/write operations to the keystore. Next, at block 606, the system firmware continues booting the virtual machine by loading the bootloader. Next, at block 608, the system firmware determines if the bootloader is encrypted. If the bootloader is not encrypted, the process skips blocks 610 and 612. Otherwise, at block 610, the system firmware loads the bootloader key from the keystore. In some embodiments, the bootloader key is a symmetric key also used to encrypt the bootloader. Next, at block 612, the system firmware decrypts the bootloader using the bootloader key. Next, at block 614, the hypervisor implements first tier isolation that prohibits the system firmware from accessing the keystores of other virtual machines. Next, at block 616, the bootloader selects a password for authenticating to the hypervisor and optionally for read/write operations to the keystore. Next, at block 618, the bootloader firmware continues to boot the virtual machine by loading the VM image (or kernel). Next, at block 620, the bootloader determines if the VM image is encrypted. If the VM is not encrypted, the process skips blocks 622 and 624. Otherwise, at block 622, the bootloader loads the VM image key from the keystore. In some embodiments, the VM image key is a symmetric key also used to encrypt the VM image. Next, at block 624, the bootloader decrypts the VM image using the VM image key. Next, at block 626, the hypervisor implements first and second tier isolation that prohibits bootloader from accessing the keystores of other VMs and from accessing keys written to the keystore by the system firmware. Next, at block 628, the kernel selects a password for authenticating to the hypervisor and optionally for read/write operations to the keystore. Next, at block 630, the kernel from the VM image takes over execution of the VM. Next, at block 632, the hypervisor implements first and second tier isolation that prohibits the kernel from accessing the keystores of other VMs and from accessing keys written to the keystore by the system firmware or the bootloader.

Figure 7:
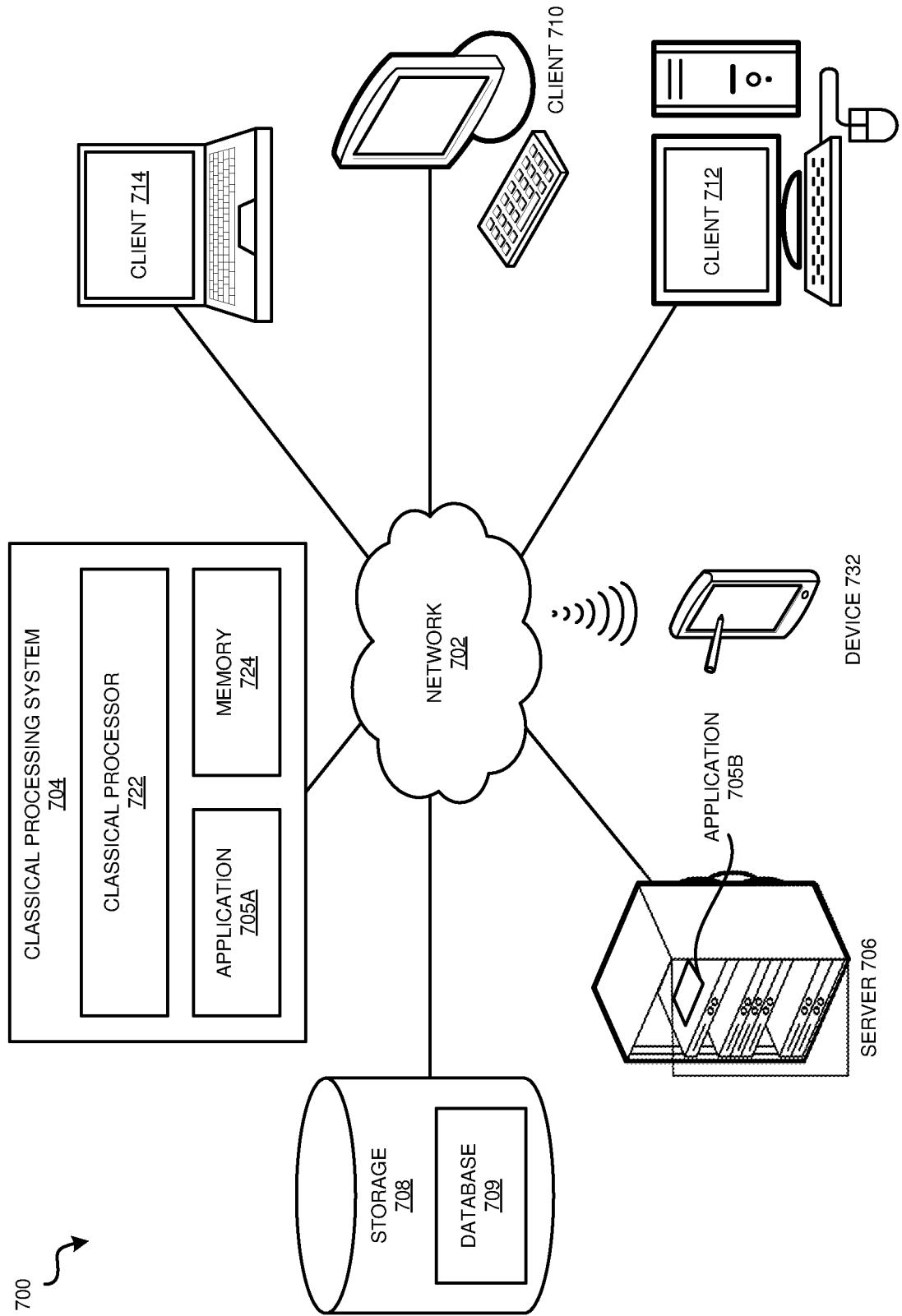
FIG. 7 depicts a block diagram of a network of data processing systems in which illustrative embodiments may be implemented.

With reference to FIG. 7, this figure depicts a block diagram of a network of data processing systems in which illustrative embodiments may be implemented. Data processing environment 700 is a network of computers in which the illustrative embodiments may be implemented. Data processing environment 700 includes network 702. Network 702 is the medium used to provide communications links between various devices and computers connected together within data processing environment 700. Network 702 may include connections, such as wire, wireless communication links, or fiber optic cables.

Clients or servers are only example roles of certain data processing systems connected to network 702 and are not intended to exclude other configurations or roles for these data processing systems. Data processing system 704 couples to network 702. Software applications may execute on any data processing system in data processing environment 700. Any software application described as executing in processing system 704 in FIG. 7 can be configured to execute in another data processing system in a similar manner. Any data or information stored or produced in data processing system 704 in FIG. 7 can be configured to be stored or produced in another data processing system in a similar manner. A data processing system, such as data processing system 704, may contain data and may have software applications or software tools executing computing processes thereon. In an embodiment, data processing system 704 includes memory 724, which includes application 705A that may be configured to implement one or more of the data processor functions described herein in accordance with one or more embodiments.

In some embodiments, server 706 is an example of host system 300 of FIG. 3. Server 706 couples to network 702 along with storage unit 708. Storage unit 708 includes a database 709 configured to store data as described herein with respect to various embodiments, for example image data and attribute data.

Clients 710, 712, and 714 are also coupled to network 702. Server 706, or client 710, 712, or 714 may contain data and may have software applications or software tools executing computing processes thereon.

Only as an example, and without implying any limitation to such architecture, FIG. 7 depicts certain components that are usable in an example implementation of an embodiment. For example, server 706, and clients 710, 712, 714, are depicted as servers and clients only as example and not to imply a limitation to a client-server architecture. As another example, an embodiment can be distributed across several data processing systems, and a data network as shown, whereas another embodiment can be implemented on a single data processing system within the scope of the illustrative embodiments. Data processing systems 706, 710, 712, and 714 also represent example nodes in a cluster, partitions, and other configurations suitable for implementing an embodiment.

Device 732 is an example of a computing device that may remotely interact with a VM from across a network. For example, device 732 can take the form of a smartphone, a tablet computer, a laptop computer, client 710 in a stationary or a portable form, a wearable computing device, or any other suitable device. In an embodiment, device 732 sends requests to server 706 to perform one or more data processing tasks by neural network application 705B such as initiating processes described herein of the neural network. Any software application described as executing in another data processing system in FIG. 7 can be configured to execute in device 732 in a similar manner. Any data or information stored or produced in another data processing system in FIG. 7 can be configured to be stored or produced in device 732 in a similar manner.

Server 706, storage unit 708, data processing system 704, and clients 710, 712, and 714, and device 732 may couple to network 702 using wired connections, wireless communication protocols, or other suitable data connectivity. Clients 710, 712, and 714 may be, for example, personal computers or network computers.

In the depicted example, server 706 may provide data, such as boot files, operating system images, and applications to clients 710, 712, and 714. Clients 710, 712, and 714 may be clients to server 706 in this example. Clients 710, 712, 714, or some combination thereof, may include their own data, boot files, operating system images, and applications. Data processing environment 700 may include additional servers, clients, and other devices that are not shown.

In the depicted example, memory 724 may provide data, such as boot files, operating system images, and applications to processor 722. Processor 722 may include its own data, boot files, operating system images, and applications. Data processing environment 700 may include additional memories, processors, and other devices that are not shown.

In an embodiment, one or more of neural network application 705A of data processing system 704 and neural network application 705B of server 706 implements an embodiment of a neural network, such as a DNN, as described herein. In a particular embodiment, the neural network is implemented using one of network application 705A and network application 705B within a single server or processing system. In another particular embodiment, the neural network is implemented using both network application 705A and network application 705B within a single server or processing system. Server 706 includes multiple GPUs 707 including multiple nodes in which each node may include one or more GPUs as described herein.

In the depicted example, data processing environment 700 may be the Internet. Network 702 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 700 also may be implemented as a number of different types of networks, such as for example, an intranet, a local area network (LAN), or a wide area network (WAN). FIG. 7 is intended as an example, and not as an architectural limitation for the different illustrative embodiments.

Among other uses, data processing environment 700 may be used for implementing a client-server environment in which the illustrative embodiments may be implemented. A client-server environment enables software applications and data to be distributed across a network such that an application functions by using the interactivity between a client data processing system and a server data processing system. Data processing environment 700 may also employ a service-oriented architecture where interoperable software components distributed across a network may be packaged together as coherent business applications. Data processing environment 700 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

Figure 8:
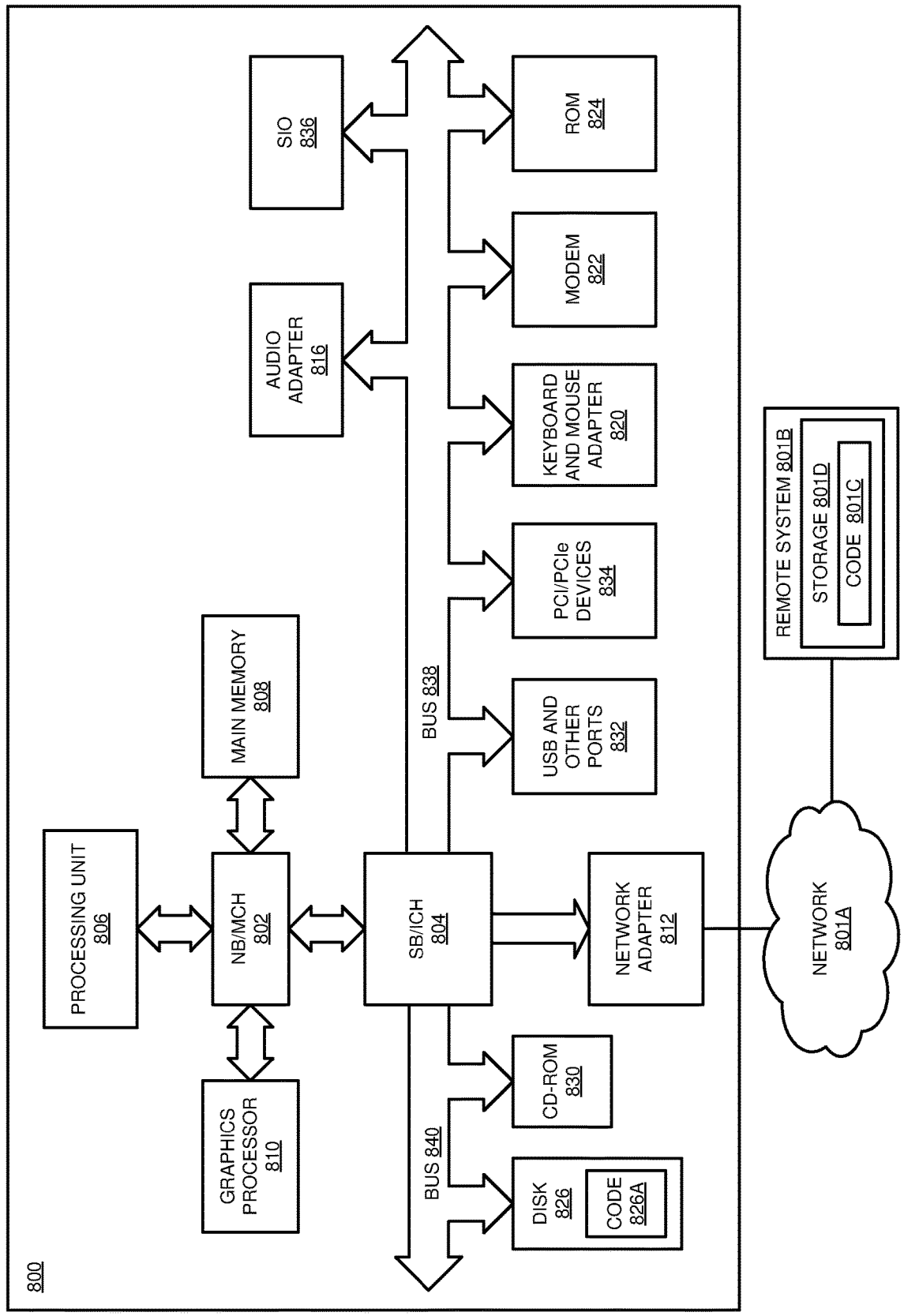
FIG. 8 depicts a block diagram of a data processing system in which illustrative embodiments may be implemented.

With reference to FIG. 8, this figure depicts a block diagram of a data processing system in which illustrative embodiments may be implemented. Data processing system 800 is an example of a computer, such as data processing system 704, server 706, or clients 710, 712, and 714 in FIG. 7, or another type of device in which computer usable program code or instructions implementing the processes may be located for the illustrative embodiments.

Data processing system 800 is also representative of a data processing system or a configuration therein, such as data processing system 732 in FIG. 7 in which computer usable program code or instructions implementing the processes of the illustrative embodiments may be located. Data processing system 800 is described as a computer only as an example, without being limited thereto. Implementations in the form of other devices, such as device 732 in FIG. 7, may modify data processing system 800, such as by adding a touch interface, and even eliminate certain depicted components from data processing system 800 without departing from the general description of the operations and functions of data processing system 800 described herein.

In the depicted example, data processing system 800 employs a hub architecture including North Bridge and memory controller hub (NB/MCH) 802 and South Bridge and input/output (I/O) controller hub (SB/ICH) 804. Processing unit 806, main memory 808, and graphics processor 810 are coupled to North Bridge and memory controller hub (NB/MCH) 802. Processing unit 806 may contain one or more processors and may be implemented using one or more heterogeneous processor systems. Processing unit 806 may be a multi-core processor. Graphics processor 810 may be coupled to NB/MCH 802 through an accelerated graphics port (AGP) in certain implementations.

In the depicted example, local area network (LAN) adapter 812 is coupled to South Bridge and I/O controller hub (SB/ICH) 804. Audio adapter 816, keyboard and mouse adapter 820, modem 822, read only memory (ROM) 824, universal serial bus (USB) and other ports 832, and PCI/PCIe devices 834 are coupled to South Bridge and I/O controller hub 804 through bus 838. Hard disk drive (HDD) or solid-state drive (SSD) 826 and CD-ROM 830 are coupled to South Bridge and I/O controller hub 804 through bus 840. PCI/PCIe devices 834 may include, for example, Ethernet adapters, add-in cards, and PC cards for notebook computers. PCI uses a card bus controller, while PCIe does not. ROM 824 may be, for example, a flash binary input/output system (BIOS). Hard disk drive 826 and CD-ROM 830 may use, for example, an integrated drive electronics (IDE), serial advanced technology attachment (SATA) interface, or variants such as external-SATA (eSATA) and micro-SATA (mSATA). A super I/O (SIO) device 836 may be coupled to South Bridge and I/O controller hub (SB/ICH) 804 through bus 838.

Memories, such as main memory 808, ROM 824, or flash memory (not shown), are some examples of computer usable storage devices. Hard disk drive or solid-state drive 826, CD-ROM 830, and other similarly usable devices are some examples of computer usable storage devices including a computer usable storage medium.

An operating system runs on processing unit 806. The operating system coordinates and provides control of various components within data processing system 800 in FIG. 8. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 800.

Instructions for the operating system, the object-oriented programming system, and applications or programs, such as application 705 in FIG. 7, are located on storage devices, such as in the form of code 826A on hard disk drive 826, and may be loaded into at least one of one or more memories, such as main memory 808, for execution by processing unit 806. The processes of the illustrative embodiments may be performed by processing unit 806 using computer implemented instructions, which may be located in a memory, such as, for example, main memory 808, read only memory 824, or in one or more peripheral devices.

Furthermore, in one case, code 826A may be downloaded over network 801A from remote system 801B, where similar code 801C is stored on a storage device 801D. In another case, code 826A may be downloaded over network 801A to remote system 801B, where downloaded code 801C is stored on a storage device 801D.

The hardware in FIGS. 7-8 may vary depending on the implementation. Other internal hardware or peripheral devices, such as flash memory, equivalent non-volatile memory, or optical disk drives and the like, may be used in addition to or in place of the hardware depicted in FIGS. 7-8. In addition, the processes of the illustrative embodiments may be applied to a multiprocessor data processing system.

In some illustrative examples, data processing system 800 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 808 or a cache, such as the cache found in North Bridge and memory controller hub 802. A processing unit may include one or more processors or CPUs.

The depicted examples in FIGS. 7-8 and above-described examples are not meant to imply architectural limitations. For example, data processing system 800 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 800 using virtualized manifestation of some or all components depicted in data processing system 800. For example, in a virtual machine, virtual device, or virtual component, processing unit 806 is manifested as a virtualized instance of all or some number of hardware processing units 806 available in a host data processing system, main memory 808 is manifested as a virtualized instance of all or some portion of main memory 808 that may be available in the host data processing system, and disk 826 is manifested as a virtualized instance of all or some portion of disk 826 that may be available in the host data processing system. The host data processing system in such cases is represented by data processing system 800.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer-implemented method comprising:
   executing, by a hypervisor, a bootloader with access to a first logical partition of a non-volatile memory, the first logical partition storing a keystore;
   loading, by the bootloader, a kernel with access to the first logical partition of the non-volatile memory associated with a first virtual machine;
   enforcing, by the hypervisor, a first-tier isolation policy that prohibits the kernel from accessing a second logical partition of the memory associated with a second virtual machine;
   enforcing, by the hypervisor, a second-tier isolation policy that prohibits the kernel from accessing a bootloader encryption key written to the keystore by the bootloader;
   receiving, by the bootloader, an encryption key from the keystore;
   performing, by the bootloader, a cryptographic algorithm using the encryption key on the kernel;
   executing, by the bootloader in an event that the performing of the cryptographic algorithm produces a first result, the kernel with access to the first logical partition of the non-volatile memory; and
   halting, by the bootloader in an event that the performing of the cryptographic algorithm fails to produce the first result, booting of the kernel and generating an error message.

2. The method of claim 1, wherein the kernel has been digitally signed with a private key of a key pair with a public key.

3. The method of claim 1, wherein the performing of the cryptographic algorithm includes testing the kernel for authenticity.

4. The method of claim 3, wherein the first result is indicative of the kernel being authentic.

5. The method of claim 1, further comprising:
   detecting, by the bootloader, whether the kernel is encrypted,
   wherein the performing of the cryptographic algorithm comprises attempting, responsive to detecting that the kernel is encrypted, to decrypt the kernel using the encryption key.

6. The method of claim 1, wherein the executing of the kernel in the first logical partition comprises executing the kernel as the first virtual machine.

7. The method of claim 1, further comprising:
enforcing, by the hypervisor, third-tier isolation policy that prohibits the kernel from accessing a third logical partition of the memory associated with another user of the first virtual machine.

8. The method of claim 7, further comprising:
enforcing, by the hypervisor, a fourth-tier isolation policy that prohibits the kernel from accessing an operating system encryption key written to the keystore by an operating system of the second virtual machine.

9. The method of claim 1, further comprising:
requesting, by the kernel using a write interface of the hypervisor, writing of a kernel password to the keystore.

10. The method of claim 1, further comprising:
loading, by the hypervisor, the bootloader with access to the first logical partition of the non-volatile memory.

11. The method of claim 10, further comprising:
detecting, by the hypervisor, whether the bootloader is encrypted.

12. The method of claim 11, further comprising:
performing, by the hypervisor, the cryptographic algorithm on the bootloader using the bootloader encryption key from the keystore,
wherein the performing of the cryptographic algorithm on the bootloader comprises attempting, responsive to detecting that the bootloader is encrypted, to decrypt the bootloader using the bootloader encryption key.

13. The method of claim 12, further comprising:
wherein the kernel and the bootloader are associated with the first virtual machine and the second logical partition is associated with the second virtual machine.

14. The method of claim 13, further comprising:
enforcing, by the hypervisor, a second-tier isolation policy that prohibits the kernel from accessing the bootloader encryption key written to the keystore by the bootloader and implements a trust that requires the kernel to trust the bootloader.

15. A computer program product comprising one or more computer readable storage media, and program instructions collectively stored on the one or more computer readable storage media, the program instructions executable by a processor to cause the processor to perform operations comprising:
executing, by a hypervisor, a bootloader with access to a first logical partition of a non-volatile memory, the first logical partition storing a keystore;
loading, by the bootloader, a kernel with access to the first logical partition of the non-volatile memory associated with a first virtual machine;
enforcing, by the hypervisor, a first-tier isolation policy that prohibits the kernel from accessing a second logical partition of the memory associated with a second virtual machine;
enforcing, by the hypervisor, a second-tier isolation policy that prohibits the kernel from accessing a bootloader encryption key written to the keystore by the bootloader;
receiving, by the bootloader, an encryption key from the keystore;
performing, by the bootloader, a cryptographic algorithm using the encryption key on the kernel;
executing, by the bootloader in an event that the performing of the cryptographic algorithm produces a first result, the kernel with access to the first logical partition of the non-volatile memory; and
halting, by the bootloader in an event that the performing of the cryptographic algorithm fails to produce the first result, booting of the kernel and generating an error message.

16. The computer program product of claim 15, wherein the stored program instructions are stored in a computer readable storage device in a data processing system, and wherein the stored program instructions are transferred over a network from a remote data processing system.

17. The computer program product of claim 15, wherein the stored program instructions are stored in a computer readable storage device in a server data processing system, and wherein the stored program instructions are downloaded in response to a request over a network to a remote data processing system for use in a computer readable storage device associated with the remote data processing system, further comprising:
program instructions to meter use of the program instructions associated with the request; and
program instructions to generate an invoice based on the metered use.

18. The computer program product of claim 15, further comprising:
enforcing, by the hypervisor, third-tier isolation policy that prohibits the kernel from accessing a third logical partition of the memory associated with another user of the first virtual machine; and
enforcing, by the hypervisor, fourth-tier isolation policy that prohibits the kernel from accessing an operating system encryption key written to the keystore by an operating system of the second virtual machine.

19. A computer system comprising a processor and one or more computer readable storage media, and program instructions collectively stored on the one or more computer readable storage media, the program instructions executable by the processor to cause the processor to perform operations comprising:
executing, by a hypervisor, a bootloader with access to a first logical partition of a non-volatile memory, the first logical partition storing a keystore;
loading, by the bootloader, a kernel with access to the first logical partition of the non-volatile memory associated with a first virtual machine;
enforcing, by the hypervisor, a first-tier isolation policy that prohibits the kernel from accessing a second logical partition of the memory associated with a second virtual machine;
enforcing, by the hypervisor, a second-tier isolation policy that prohibits the kernel from accessing a bootloader encryption key written to the keystore by the bootloader;
receiving, by the bootloader, an encryption key from the keystore;
performing, by the bootloader, a cryptographic algorithm using the encryption key on the kernel;
executing, by the bootloader in an event that the performing of the cryptographic algorithm produces a first result, the kernel with access to the first logical partition of the non-volatile memory; and
halting, by the bootloader in an event that the performing of the cryptographic algorithm fails to produce the first result, booting of the kernel and generating an error message.

20. The computer system of claim 19, further comprising:
enforcing, by the hypervisor, third-tier isolation policy that prohibits the kernel from accessing a third logical partition of the memory associated with another user of the first virtual machine; and enforcing, by the hypervisor, fourth-tier isolation policy that prohibits the kernel from accessing an operating system encryption key written to the keystore by an operating system of the second virtual machine.

\* \* \* \* \*